United States Patent
Kumar et al.

(10) Patent No.: US 9,392,185 B1
(45) Date of Patent: Jul. 12, 2016

(54) APPARATUS AND METHOD FOR IMAGE MOSIACKING UNDER LOW-LIGHT CONDITIONS

(71) Applicant: Xerox Corporation, Norwalk, CT (US)

(72) Inventors: Jayant Kumar, Webster, NY (US); Sungmin Eum, Silver Spring, MD (US); Raja Bala, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/619,956

(22) Filed: Feb. 11, 2015

(51) Int. Cl.
*H04N 5/235* (2006.01)
*H04N 5/225* (2006.01)
*H04N 5/265* (2006.01)

(52) U.S. Cl.
CPC ........... *H04N 5/2354* (2013.01); *H04N 5/2256* (2013.01); *H04N 5/265* (2013.01)

(58) Field of Classification Search
None
See application file for complete search history.

(56) References Cited

U.S. PATENT DOCUMENTS

| 2013/0329132 A1* | 12/2013 | Tico | H04N 5/14 348/571 |
| 2015/0063720 A1* | 3/2015 | Maltz | G06T 5/007 382/284 |

* cited by examiner

*Primary Examiner* — Twyler Haskins
*Assistant Examiner* — Angel L Garces-Rivera (57) ABSTRACT

An apparatus, method and non-transitory computer readable medium for mosaicking a plurality of images captured in a low-light condition are disclosed. For example, the apparatus includes an image capturing module, a flash module, a computer-readable medium and a processor. The processor executes a plurality of instructions stored on the computer-readable medium. The operations include determining a spacing between each one of the plurality of images, capturing the plurality of images in accordance with the spacing, aligning the plurality of images that are captured and mosaicking the plurality of images that are aligned into a single image by, for each one of the plurality of images, replacing one or more pixels in the respective flash spot region using one or more pixels in a subsequent image that is in a same location as the respective flash spot region such that the information is recovered.

20 Claims, 5 Drawing Sheets

APPARATUS AND METHOD FOR IMAGE MOSIACKING UNDER LOW-LIGHT CONDITIONS

The present disclosure relates generally to mosaicking images and, more particularly, to an apparatus and method for mosaicking under low-light conditions.

BACKGROUND

Mobile devices are being increasingly used to capture images of documents, such as, tax forms, insurance claims, bank transactions, receipts, etc. Certain mobile applications (apps) enable users to scan documents into specific workflows, such as, mortgage applications, insurance applications and student loan processes. One problem is that often, the documents encountered in a workflow have a large form factor that prevents convenient capture with a single image from the mobile device.

One solution is for the user to hold the mobile device away at a large distance from the document to capture the entire document within a single image. However, this may lead to a poor resolution of text, which drastically affects the quality of post-processing.

In addition, when multiple images are captured in a low light condition for mosaicking, the torch light or flash on the mobile device may be turned on when capturing the image. However, using the flash often creates a flash spot region on the captured image. Thus, when the images are stitched together the flash spot regions in each image may lead to information loss.

SUMMARY

According to aspects illustrated herein, there are provided an apparatus, a method and a non-transitory computer readable medium for mosaicking a plurality of images captured in a low-light condition. One disclosed feature of the embodiments is an apparatus that comprises an image capturing module for capturing a plurality of images of an object, a flash module for activating a flash each time the image capturing module captures one of the plurality of images in the low-light condition, a computer-readable medium in communication with the image capturing module for storing the plurality of images that are captured, each one of the plurality of images having a flash spot region and a processor in communication with the image capturing module, the flash module and the computer-readable medium for executing a plurality of instructions stored on the computer-readable medium. In one embodiment, the operations comprise determining a spacing between each one of the plurality of images to minimize a number of the plurality of images while capturing all portions of the object, and simultaneously recovering information that is lost due to a respective flash spot region in each one of the plurality of images captured in the low-light condition, capturing the plurality of images in accordance with the spacing, aligning the plurality of images that are captured and mosaicking the plurality of images that are aligned into a single image by, for each one of the plurality of images, replacing one or more pixels in the respective flash spot region using one or more pixels in a subsequent image that is in a same location as the respective flash spot region such that the information is recovered.

Another disclosed feature of the embodiments is a method for mosaicking a plurality of images captured in a low-light condition comprising determining a spacing between each one of the plurality of images to minimize a number of the plurality of images while capturing all portions of the object, and simultaneously recovering information that is lost due to a respective flash spot region in each one of the plurality of images captured in the low-light condition, capturing the plurality of images in accordance with the spacing, aligning the plurality of images that are captured and mosaicking the plurality of images that are aligned into a single image by, for each one of the plurality of images, replacing one or more pixels in the respective flash spot region using one or more pixels in a subsequent image that is in a same location as the respective flash spot region such that the information is recovered.

Another disclosed feature of the embodiments is a non-transitory computer-readable medium having stored thereon a plurality of instructions, the plurality of instructions including instructions, which when executed by a processor, cause the processor to perform operations comprising determining a spacing between each one of the plurality of images to minimize a number of the plurality of images while capturing all portions of the object, and simultaneously recovering information that is lost due to a respective flash spot region in each one of the plurality of images captured in the low-light condition, capturing the plurality of images in accordance with the spacing, aligning the plurality of images that are captured and mosaicking the plurality of images that are aligned into a single image by, for each one of the plurality of images, replacing one or more pixels in the respective flash spot region using one or more pixels in a subsequent image that is in a same location as the respective flash spot region such that the information is recovered.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for mosaicking a plurality of images captured in a low-light condition. As discussed above, mobile devices are being increasingly used to capture images of documents, such as, tax forms, insurance claims, bank transactions, receipts, etc. Certain mobile apps enable users to scan documents into specific workflows, such as, mortgage applications, insurance applications and student loan processes. One problem is that often, the documents encountered in a workflow have a large form factor that prevents convenient capture with a single image from the mobile device.

In addition, when multiple images are captured in a low light condition, the torch light or flash on the mobile device may be turned on when capturing the image. However, using the flash often creates a flash spot region on the captured image. Thus, when the images are stitched together the flash spot regions in each image may lead to information loss.

Embodiments of the present disclosure provide a novel apparatus and method for mosaicking a plurality of images captured in a low-light condition. The embodiments of the present disclosure allow a mobile endpoint device to be used to capture a plurality of images of an object (e.g., a document) that is too big to capture in a single image under low light conditions using a flash or torch on the mobile endpoint device. The information lost in the flash spot region created by the flash when the image is captured may be automatically recovered from a subsequent image of the plurality of images and the plurality of images may be stitched together (e.g., mosaicking) into a single image of the object.

Figure 1:
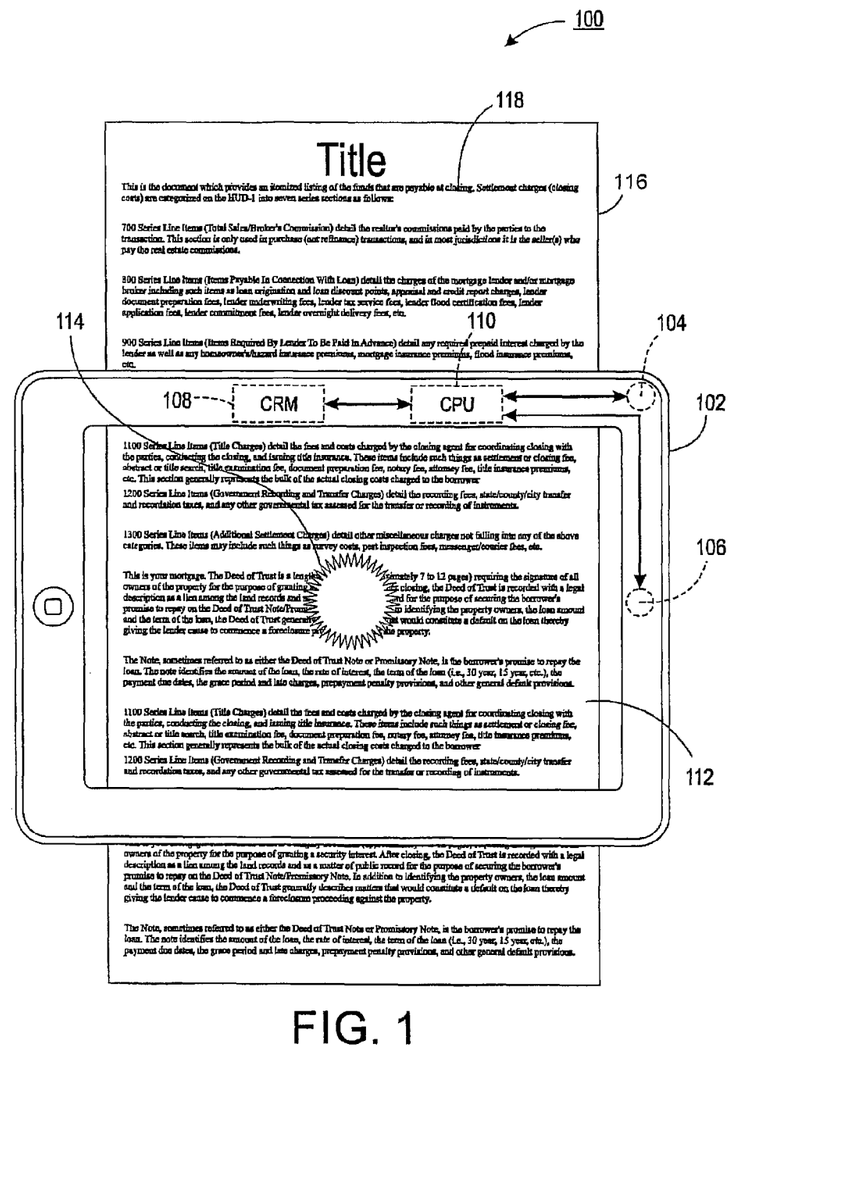
FIG. 1 illustrates one embodiment of a block diagram of an example system of the present disclosure.

FIG. 1 illustrates an example system 100 of the present disclosure. In one embodiment, the system 100 includes a mobile endpoint device 102 and an object 116. In one embodiment, the mobile endpoint device 102 may be a smart phone, a tablet computer, and the like.

In one embodiment, a back side of the mobile endpoint device 102 may include an image capture module 106 (e.g., a camera lens or camera built into the mobile endpoint device 102) for capturing the plurality of images or videos. The back side of the mobile endpoint device 102 may also include a flash or torch module 104 for activating a flash each time an image is captured in a low-light condition. In one embodiment, the low-light condition may be defined as an environment where an object being photographed is dimly lit such that a photograph of the object without a flash would be underexposed.

The mobile endpoint device 102 may also include a computer readable medium (CRM) 108 for storing the plurality of images that are captured and a plurality of instructions for a processor (e.g., a central processing unit (CPU)) 110 to execute an operation in accordance with the plurality of instructions. The CPU 110 may be in communication with the CRM 108, the flash module 104 and the image capture module 106 to coordinate the capturing of images and triggering of the flash module 104.

The mobile endpoint device 102 may also include a display 112 to show a user the images that are being captured and prompt a user when to capture an image, if necessary. The display 112 may also be used to review the single image of the object that is generated by mosaicking the plurality of images together, as discussed below.

In one embodiment, the object 116 may be a document that includes text 118. A user may want to use his or her mobile endpoint device 102 to capture an image of the document and enter the image into a workflow for further processing (e.g., optical character recognition, binarization, and the like). However, some documents may be too large for the image capture module 106 to capture an image of the document in a single frame, while maintaining a sufficient resolution for the text 118 to be recognizable. Thus, the mobile endpoint device 102 may be required to take multiple images that are then subsequently mosaicked together (e.g., stitched together). Although a document is used as an example of the object 116, it should be noted that the object 116 may be any item or thing.

In addition, most images are captured indoors where lighting may be insufficient creating a low-light condition. Under the low-light conditions, the flash module 104 usually triggers a flash that creates a flash spot region (FSR) 114 on the image.

In one embodiment, the mobile endpoint device 102 may be used to capture a plurality of images of the object 116 and mosaic (e.g., stitch together) the plurality of images into a single image of the object 116. The text 118 located in the FSR 114 is typically lost or hidden by the FSR 114. Previous mosaicking algorithms would fail to account for the FSR 114 or recover the information that was lost in the FSR 114. As a result, the stitched image would have periodic FSRs 114 with the information in the FSRs 114 being lost.

In one embodiment, the mobile endpoint device 102 may be modified and improved such that the mobile endpoint device 102 may automatically identify the FSR 114 of each image that is captured and track a movement of the mobile endpoint device 102 such that a spacing between each one of the plurality of images can be determined to minimize a number of images that need to be captured, while recovering information that is lost due to each respective FSR 114 of each image in the low-light condition. The plurality of images may be aligned and then mosaicked together such that the information previously lost in each FSR 114 of each image is recovered.

Figure 2:
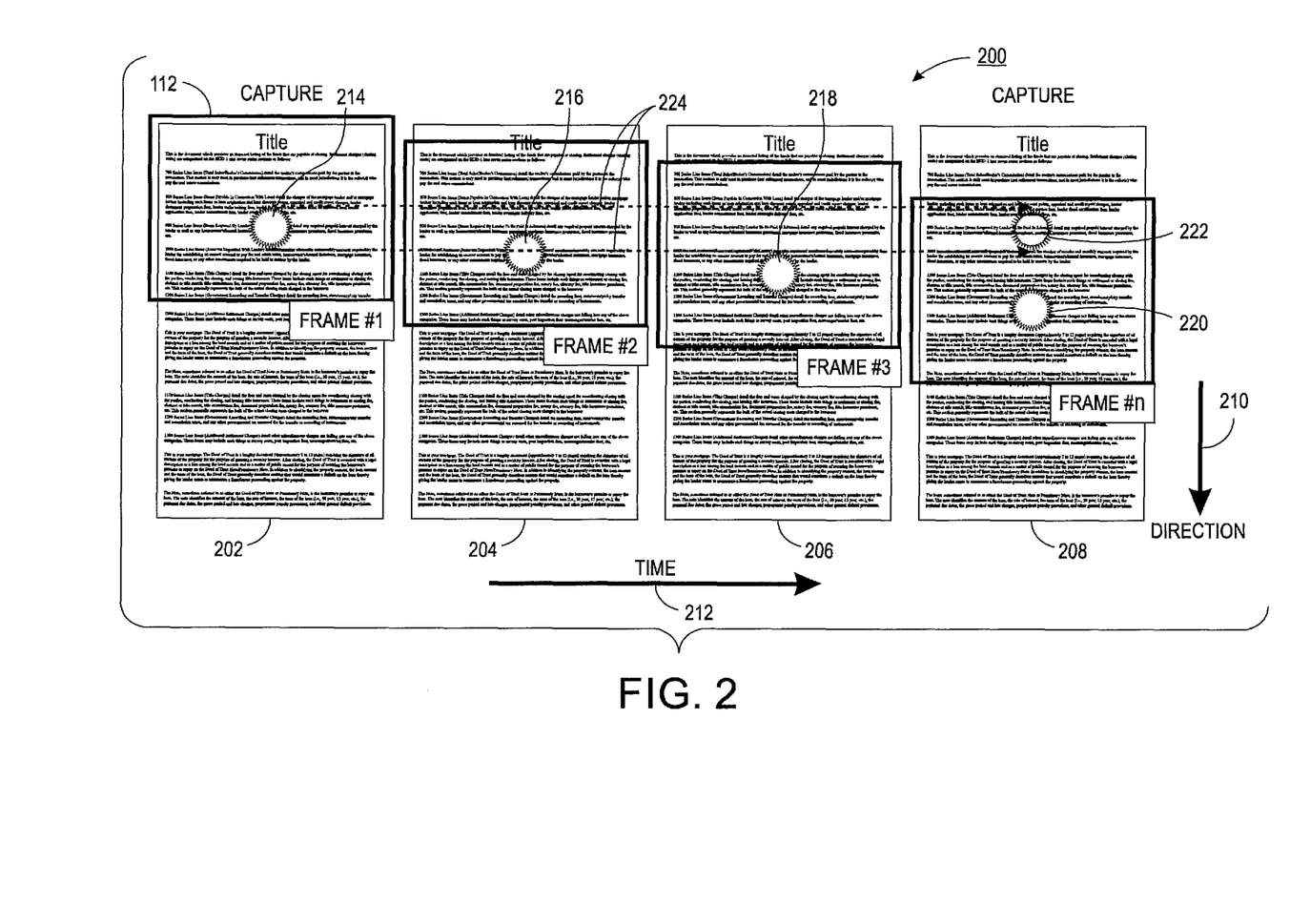
FIG. 2 illustrates an example of multiple images being captured of a document.

FIG. 2 illustrates an example 200 of multiple images being captured of a document and how the spacing is calculated. In one embodiment, the display 112 of the mobile endpoint device 102 may be moved from a top of the object 116 towards a bottom of the object 116 as indicated by a direction arrow 210. In addition, a first image 202 may be captured and each of the subsequent images 204, 206, and 208 may be captured later in time as indicated by an arrow 212.

In one embodiment, the first image 202 may be manually captured by a user of the mobile endpoint device 102. The display 112 may have an interface that prompts a user to capture a top most portion of the object 116. In one embodiment, the mobile endpoint device 102 may detect a size of the first image 202 that meets a minimum size threshold or a minimum resolution threshold that may be acceptable. For example, the display 112 may prompt the user to move the mobile endpoint device 102 closer to the object 116 until the minimum resolution threshold is met and prompt the user to take the first image 202.

After the first image 202 is taken, the mobile endpoint device 102 may determine a spacing between each one of the subsequent images 204, 206, and 208 to minimize a number of images that need to be captured while recovering information that is lost due to respective FSRs 214, 216, 218 and 220. In one embodiment, the spacing may be determined by identifying the respective FSRs 214, 216, 218 and 220 and tracking a movement of the mobile endpoint device 102 simultaneously.

For example, after the first image 202 is captured, at a later time the mobile endpoint device 102 may be moved downward to display the image 204. However, the respective FSR 216 of the image 204 would be within the respective FSR 214 of the first image 202 as indicated by the respective FSR 216 falling within an area between dashed lines 224 that represent a width of the respective FSR 214. In other words, all the information lost by the respective FSR 214 in the first image 202 cannot be recovered using the image 204 as some of the information is still hidden or lost by the respective FSR 216 in the image 204. As a result, the image 204 is not captured by the mobile endpoint device 102.

The mobile endpoint device 102 may be kept moving downward to display the image 206. Notably, there is no overlap between respective FSR 218 of the image 206 and the respective FSR 214 of the first image 202. Thus, all of the information lost from the respective FSR 214 may be recovered from the pixels in the same location of the image 206.

However, there is overlap in content that is not needed in a region above the dashed lines 224. Thus, the image 206 is not captured.

The mobile endpoint device 102 may continue moving downward displaying additional images until an "$n^{th}$" image 208 is displayed. The image 208 may have a respective FSR 220 that does not overlap the respective FSR 214 of the first image 202. In addition, there is a minimal amount of overlap between additional content as the image 208 has an upper boundary that is just above the respective FSR 214 shown as an outline 222 of a location of the respective FSR 214 on the image 208 and/or the dashed lines 224. Thus, distance between the image 202 and the image 208 may be a proper spacing between images that are captured based on a location of the FSR 214 of the first image 202 and the image 208 may be captured by the mobile endpoint device 102.

In one embodiment, the next image to be captured may be based on a spacing calculated in a similar fashion with respect to the respective FSR 220 of the image 208. The process may be repeated until a minimum number of images needed to mosaic the entire document into a single image, while having images to recover information lost in the respective FSRs is captured.

In one embodiment, to identify a location of an FSR a two-pass window based approach may be employed and a number of pixels within a sliding window with brightness greater than a threshold may be counted. In one embodiment, the threshold may be the p-th percentile of brightness values over an entire image. In a first pass, p is set to a high value (e.g., a $99^{th}$ percentile) to capture very bright windows. In a second pass, p is set to a lower value (e.g., $98^{th}$ percentile) and a window is selected only if it is adjacent to a window in the first pass. This helps in accurately localizing the FSR, while being computationally efficient.

Next additional logic is employed to analyze the FSR to ensure that there is significant loss in the content in the FSR. This takes care of cases where the FSR happens to be in a blank part of the image, or the capture is such that the flash does not noticeably degrade the document content.

Simultaneously, the movement of the mobile endpoint device 102 may be tracked based on a location of the respective FSR of the first image and subsequent images for subsequent images that need to be captured and based on a phase correlation. In one embodiment, the phase correlation may include three steps comprising: 1) calculating a cross-power spectrum between the first image and the subsequent image, 2) normalizing the cross-power spectrum, and 3) acquiring a relative motion displacement in a spatial domain by finding a location of a peak in the cross-power spectrum that is normalized. The three steps may be represented by Equations (1)-(3) below:

$$R = \frac{\mathcal{F}\{I_1\} \circ \mathcal{F}\{I_2\}^*}{|\mathcal{F}\{I_1\}\mathcal{F}\{I_2\}^*|} \quad (1)$$

$$r = F^{-1}\{R\} \quad (2)$$

$$(\Delta x, \Delta y) = \underset{(x,y)}{\operatorname{argmax}}\{r\} \quad (3)$$

where R represents the cross-power spectrum of images $I_1$ and $I_2$, r represents the normalized cross-power spectrum of R and ($\Delta x$, $\Delta y$) represent the relative motion displacement in an x and y coordinate system based on a location of a peak in the cross-power spectrum that is normalized r.

In one embodiment, once the plurality of images is captured, the plurality of images may be aligned. In one embodiment, the alignment for two images that overlap may include extracting and matching one or more scale-invariant features (e.g., scale invariant feature transform (SIFT), speeded up robust features (SURF), and the like) of the two images. Feature correspondences are then used to estimate the perspective transformation between each pair of overlapping images.

In order to enhance the accuracy of the registration, a robust homography estimation is applied which performs outlier rejection using random sample consensus (RANSAC) followed by a refinement scheme using a Levenberg-Marquardt nonlinear solver to find an optimal homographic (perspective) transform that best fits the inlier data. Using the estimated homography between the overlapping images, the originally captured images can be warped and projected onto a common image plane.

After the alignment process, the plurality of images may be mosaicked (e.g., stitched together) into a single image of the entire object 116 using a Graphcut-based blending function that accounts for the respective FSR 114 of each captured image.

The Graphcut-based blending function for mosaicking in a low-light environment may have two motivations. First, by finding a seam that defines a path through the overlapping region in a manner that avoids cutting through blocks of text 118, and stitching them together, results in a mosaic that can naturally avoid having any undesirable artifacts such as ghosting artifacts (e.g., the phenomenon of the same content appearing twice with a slight offset). Second, by taking into account the location of the respective FSR 114 and modifying a data term cost used in the Graphcut-based blending function, a cut can be generated which avoids having any FSR on the resulting mosaicked image. In other words, one embodiment of the present disclosure modifies the Graphcut-based blending function to account for the respective FSRs 114 in each image that is captured during the mosaicking of the images and recovering information lost by the respective FSR 114 by replacing the pixels in the location of the respective FSR 114 with pixels from another overlapping image that does have the respective FSR 114 in the same location.

In one embodiment, the Graphcut-based blending function may be defined by Equation (4) below:

$$E(f) = \Sigma_{\{p,q\} \in N} V_{p,q}(f_p, f_q) + \Sigma_{p \in P} D_p(f_p) \quad (4)$$

where E(f) is an energy function, $\Sigma_{\{p,q\} \in N} V_{p,q}(f_p, f_q)$ is a smoothness term and $\Sigma_{p \in P} D_p(f_p)$ is a data term. As the energy function is minimized, a labeling, f, can be acquired which is responsible for labeling each pixel p∈P as $f_p$.

The smoothness term can be explained as a sum of the penalty values $V_p$,q for all the neighboring pairs included in N. In Equation (4), N, $f_p$ and $f_q$ each indicate a set of neighboring pairs of pixels, label of pixel p and label of pixel q, respectively. This penalty is imposed on the edge between pixels p and q, whenever a cut is being made through. The data term is the sum of all the penalty $D_p$ for the pixels in P. P is the set of all pixel locations in the overlapped region and $D_p$ is the penalty imposed on pixel p when it is labeled as $f_p$.

In one embodiment of the present disclosure, for the smoothness term, Equation (5) below may be used where p and q are the neighboring pixel locations in the overlapping region of images. It should be noted that the smoothness term lets the cut favor going through neighboring pixels with similar intensity values over the neighboring pixels with larger differences.

$$V_{p,q}(p,q,A,B)=|A(p)-B(p)|+|A(q)-B(q)|, \quad (5)$$

As noted above, the Graphcut-based blending function is modified to incorporate the FSR detection results. In one embodiment, the Graphcut-based blending function is modified by incorporating the FSR detection results in the data term cost of the energy function.

The Graphcut-based blending function may be modified in a case where two overlapping images, one image with the FSR 114 ($I_{FSR}$) and the other without the FSR 114 ($I_{NO\_FSR}$) in the same location. First, the FSR 114 is detected using the method introduced above (e.g., represented by p∈{FSR}). Then a high cost for the data term $D_p$ for a first image $I_{FSR}$ is imposed on the pixel locations residing inside the FSR 114, while imposing a zero data term cost $D_p$ for a second image $I_{NO\_FSR}$ for pixels in the same location as the pixels of the first image $I_{FSR}$ that reside inside the FSR 114. The above can be formulized in Equation (6) below:

If p∈{FSR}, then $$D_p(I_{FSR})=\infty$$

$$D_p(I_{NO\_FSR})=0 \quad (6)$$

Modifying the Graphcut-based blending function with Equation (6) ensure that the Graphcut-based blending function will generate a cut that goes around the FSR and favor the pixels which come from the second image $I_{NO\_FSR}$.

Figure 3:
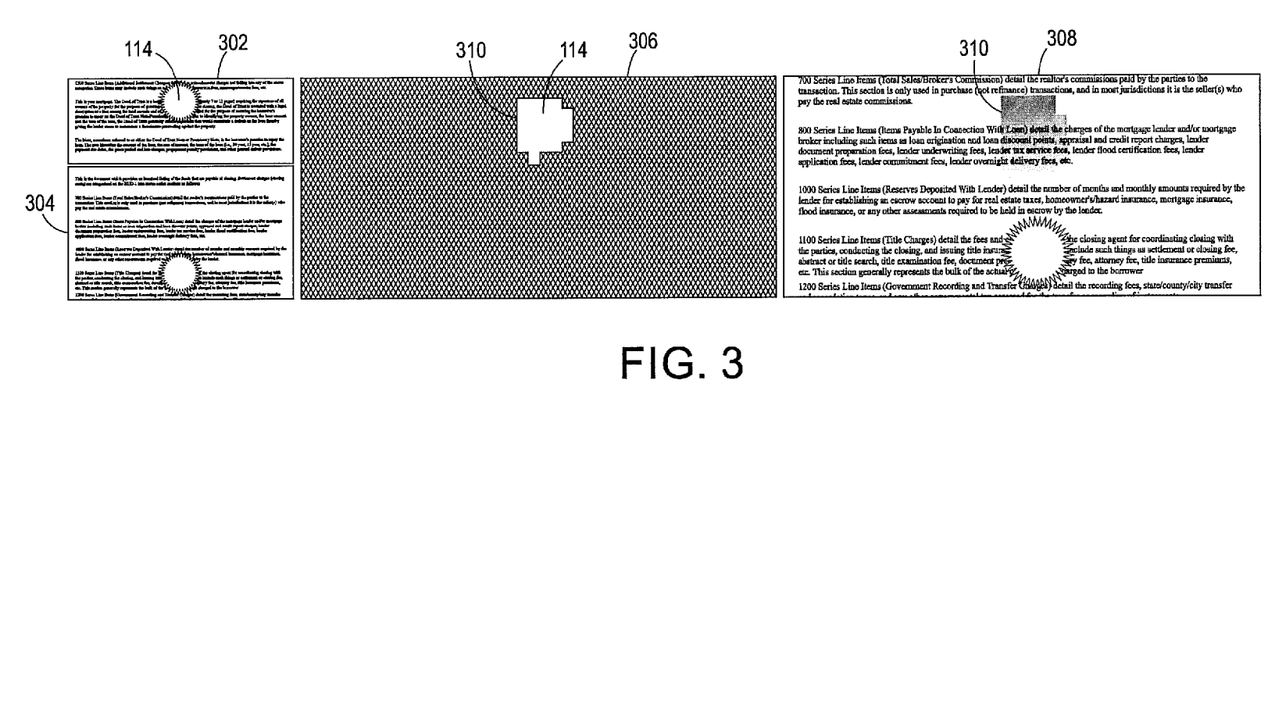
FIG. 3 illustrates an example of an FSR aware mosaicking.

FIG. 3 illustrates an example of an FSR aware mosaicking using the modified Graphcut-based blending function described above in Equations (4)-(6). FIG. 3 illustrates a first image 302 with a respective FSR 114 and a second image 304 that overlaps the first image 302, but does not have the respective FSR 114 in the same location as the first image 302. As shown in FIG. 3, the respective FSR 114 hides the text where the respective FSR 114 is located. As a result, previous mosaicking methods would simply stitch the first image 302 to subsequent images without accounting for the respective FSR 114 and the text would be lost.

However, as described above, the respective FSR 114 may be detected using the methods described above and illustrated in the image 306. The pixels associated with the respective FSR 114 are identified at a location 310 that is outlined. Then using Equations (4)-(6) above, the pixels in the respective FSR 114 of the first image are replaced by pixels at the same location 310 from the second image 304 that does not have the respective FSR 114 in the same location 310. As a result, the text that was previously lost due to the respective FSR 114 in the first image 302 is now recovered by replacing pixels located in the respective FSR 114 with pixels that reveal the previously lost information in the second image 304 in a same location as pixels located in the respective FSR 114. The result of the mosaicking is illustrated by a blended image 308.

Figure 4:
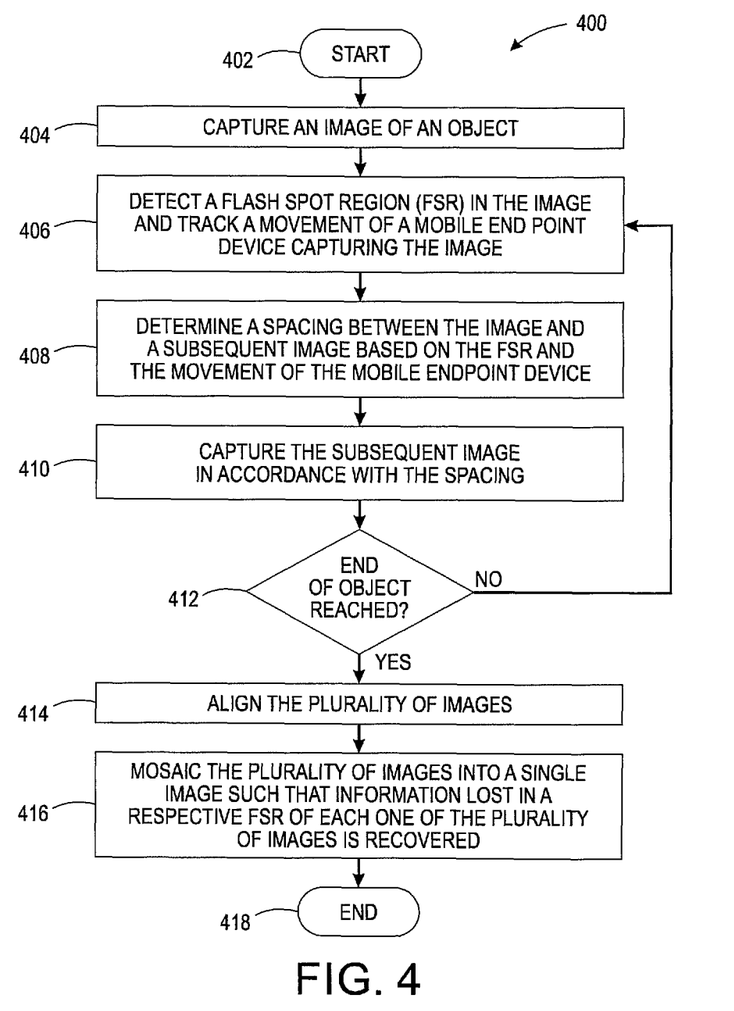
FIG. 4 illustrates a flowchart of one embodiment of an example method for mosaicking a plurality of images captured in a low-light condition.
Figure 5:
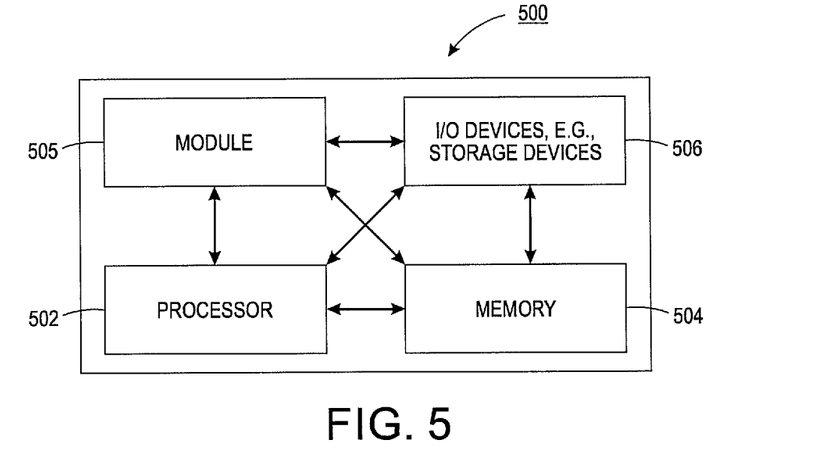
FIG. 5 illustrates a high-level block diagram of a computer suitable for use in performing the functions described herein.

FIG. 4 illustrates a flowchart of a method 400 for mosaicking a plurality of images captured in a low-light condition. In one embodiment, one or more steps or operations of the method 400 may be performed by the mobile endpoint device 102 or a computer as illustrated in FIG. 5 and discussed below.

At step 402 the method 400 begins. At step 404, the method 400 captures an image of an object. In one embodiment, the object may be a document with text that is too large (e.g., too long in length or in width) for a user to capture in a single image while maintaining a sufficient resolution for post-processing of the image. As a result, the user may be required to capture a plurality of images of the object and have the plurality of images mosaicked together to form a single image of the entire object.

At step 406, the method 400 detects a flash spot region (FSR) in the image and tracks a movement of a mobile endpoint device capturing the image. In one embodiment, the first image of the plurality of images may be captured manually by the user. The first image may be analyzed to detect the FSR and track the subsequent movement of the mobile endpoint device as the mobile endpoint device is moved towards the end of the object by the user (e.g., top to bottom for a document). The FSR detection and the tracking of the movement of the mobile endpoint device may occur simultaneously. The methods for detecting the FSR and tracking the movement of the mobile endpoint device are described above.

At step 408, the method 400 determines a spacing between the image and a subsequent image based on the FSR and the movement of the mobile endpoint device. In one embodiment, the spacing may be determined such that a minimum number of images is needed to be captured, while capturing all portions of the object and simultaneously recovering all the information that was lost due to each respective FSR of each image captured in the low-light condition. The spacing may be automatically determined based on the FSR detection and the tracking of the movement of the mobile endpoint device.

At step 410, the method 400 captures the subsequent image in accordance with the spacing. In one embodiment, the subsequent image after the first image may be captured automatically. In one embodiment, a display may have a graphical display to indicate to the user the proper movement and when the subsequent image is captured. For example, a first marker may visualize the movement of the mobile endpoint device. For example, after the first image is captured, the first marker may start at a bottom of the display of the mobile endpoint device and move upwards as the mobile endpoint device is moved down the document. A second marker may indicate the correct spacing for the next image to be captured above the first marker. When the first marker moves to be in line or on top of the second marker, the markers may indicate that the mobile endpoint device is at a proper spacing to capture the subsequent image and the mobile endpoint device may automatically capture the subsequent image.

At step 412, the method 400 determines if an end of the object is reached. For example, if the plurality of images that are being captured is that of a document, the method 400 may determine if the mobile endpoint device has reached an end or bottom most portion of the document. If the end of the object is not reached, the method 400 may return to step 406 and repeat steps 406 to 412.

However, if the end of the object is reached at step 412, the method 400 may proceed to step 414. At step 414, the method 400 aligns the plurality of images. The methods for aligning the plurality of images described above may be used to align the images.

At step 416, the method 400 mosaics the plurality of images into a single image such that information lost in a respective FSR of each one of the plurality of images is recovered. In one embodiment, the Graphcut-based blending algorithm that is modified to account for the FSR described above in Equations (4)-(6) may be used to mosaic the plurality of images together into a single image such that information lost in each respective FSR of each one of the plurality of images is recovered. At step 418, the method 400 ends.

As a result, the embodiments of the present disclosure improve the functioning of a mobile endpoint device or a computer. For example, multiple images of a document taken in low-light conditions by the mobile endpoint device or computer can be mosaicked together while including the information hidden by flash spot regions that could not otherwise be recovered without the improvements provided by the present disclosure. In other words, the technological art of image processing is improved by providing a mobile endpoint device or computer that is modified with the ability to automatically capture a plurality of images in a low-light condition and mosaic the images together while recovering information that was previously lost in the flash spot regions of each image, as disclosed by the present disclosure.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a computer that can be transformed to into a machine that is dedicated to perform the functions described herein. Notably, no computer or machine currently exists that performs the functions as described herein. As a result, the embodiments of the present disclosure improve the operation and functioning of the computer to mosaic a plurality of images captured in a low-light condition, as disclosed herein.

As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for mosaicking a plurality of images captured in a low-light condition, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for mosaicking a plurality of images captured in a low-light condition (e.g., a software program comprising computer-executable instructions) can be loaded into memory 504 and executed by hardware processor element 502 to implement the steps, functions or operations as discussed above in connection with the exemplary method 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for mosaicking a plurality of images captured in a low-light condition (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus for mosaicking a plurality of images captured in a low-light condition, comprising:
    an image capturing module for capturing the plurality of images of an object;
    a flash module in communication with the image capturing module for activating a flash each time the image capturing module captures one of the plurality of images in the low-light condition;
    a computer-readable medium in communication with the image capturing module for storing the plurality of images that are captured, each one of the plurality of images having a flash spot region; and
    a processor in communication with the image capturing module, the flash module and the computer-readable medium for executing a plurality of instructions stored on the computer-readable medium, causing the processor to perform operations, the operations comprising:
        determining a spacing between each one of the plurality of images to minimize a number of the plurality of images while capturing all portions of the object, and simultaneously recovering information that is lost due to a respective flash spot region in each one of the plurality of images captured in the low-light condition;
        capturing the plurality of images in accordance with the spacing;

aligning the plurality of images that are captured; and mosaicking the plurality of images that are aligned into a single image by, for each one of the plurality of images, replacing one or more pixels in the respective flash spot region using one or more pixels in a subsequent image that is in a same location as the respective flash spot region such that the information is recovered.

2. The apparatus of claim 1, further comprising:

a display in communication with the image capturing device and the processor for displaying the plurality of images captured by the image capturing module and displaying the spacing for each one of the plurality of images that are captured to a user as the user moves the apparatus from a beginning of the object to an end of the object.

3. The apparatus of claim 2, wherein a first image of the plurality of images is captured by the user and each subsequent ones of the plurality of images are automatically captured as the apparatus is moved by the user.

4. The apparatus of claim 3, wherein the determining the spacing comprises:

determining a location of the respective flash spot region of the first image;

calculating a movement of the apparatus based on the location of the respective flash spot region of the first image;

triggering the capture of a subsequent image automatically when the respective flash spot region of the first image is fully covered by non-flash spot regions of the subsequent image; and repeating the calculating and the triggering for the each subsequent one of the plurality of images.

5. The apparatus of claim 4, wherein the calculating the movement of the apparatus is based on a phase correlation that comprises:

calculating a cross-power spectrum between the first image and the subsequent image;

normalizing the cross-power spectrum; and acquiring a relative motion displacement of the apparatus in a spatial domain by finding a location of a peak in the cross-power spectrum that is normalized.

6. The apparatus of claim 1, wherein the aligning for a first image and a second image of the plurality of images that overlap comprises:

extracting and matching one or more scale-invariant features of the first image and the second image; and applying an estimated homography between the first image and the second image to warp and project the first image and the second image into a common image plane.

7. The apparatus of claim 1, wherein the mosaicking comprises a graphcut-based blending that is modified to account for the respective flash spot region in the each one of the plurality of images.

8. The apparatus of claim 7, wherein the graphcut-based blending that is modified to account for the respective flash spot region in the each one of the plurality of images comprises for a first image and a second image of the plurality of images being blended:

identifying a location of the one or more pixels within the respective flash spot region of the first image;

imposing a high cost for a data term of a graphcut-based blending function of the one or more pixels in the respective flash spot region of the first image; and imposing a zero cost for the data term of the graphcut-based blending function of the one or more pixels in the second image in the location of the one or more pixels within the respective flash spot region of the first image.

9. The apparatus of claim 1, wherein the apparatus comprises at least one of: a smart phone or a tablet computer.

10. The apparatus of claim 1, wherein the object is a document.

11. A method for mosaicking a plurality of images captured in a low-light condition, comprising:

determining, by a processor, a spacing between each one of the plurality of images to minimize a number of the plurality of images while capturing all portions of an object, and simultaneously recovering information that is lost due to a respective flash spot region in each one of the plurality of images captured in the low-light condition;

capturing, by the processor, the plurality of images in accordance with the spacing;

aligning, by the processor, the plurality of images that are captured; and mosaicking, by the processor, the plurality of images that are aligned into a single image by, for each one of the plurality of images, replacing one or more pixels in the respective flash spot region using one or more pixels in a subsequent image that is in a same location as the respective flash spot region such that the information is recovered.

12. The method of claim 11, further comprising:

displaying, by the processor, the spacing for each one of the plurality of images that are captured to a user as the user moves an apparatus comprising the processor from a beginning of the object to an end of the object.

13. The method of claim 12, wherein a first image of the plurality of images is captured by the user and each subsequent one of the plurality of images is automatically captured as the apparatus is moved by the user.

14. The method of claim 13, wherein the determining the spacing comprises:

determining, by the processor, a location of the respective flash spot region of the first image;

calculating, by the processor, a movement of the apparatus based on the location of the respective flash spot region of the first image;

triggering, by the processor, the capture of a subsequent image automatically when the respective flash spot region of the first image is fully covered by non-flash spot regions of the subsequent image; and repeating, by the processor, the calculating and the triggering for the each subsequent one of the plurality of images.

15. The method of claim 14, wherein the calculating the movement of the apparatus is based on computing a phase correlation comprises:

calculating, by the processor, a cross-power spectrum between the first image and the subsequent image;

normalizing, by the processor, the cross-power spectrum; and acquiring, by the processor, a relative motion displacement of the apparatus in a spatial domain by finding a location of a peak in the cross-power spectrum that is normalized.

16. The method of claim 11, wherein the aligning for a first image and a second image of the plurality of images that overlap comprises:

extracting and matching, by the processor, one or more scale-invariant features of the first image and the second image; and applying, by the processor, an estimated homography between the first image and the second image to warp and project the first image and the second image into a common image plane.

17. The method of claim 11, wherein the mosaicking comprises a graphcut-based blending that is modified to account for the respective flash spot region in the each one of the plurality of images.

18. The method of claim 17, wherein the graphcut-based blending that is modified to account for the respective flash spot region in the each one of the plurality of images comprises for a first image and a second image of the plurality of images being blended:
   identifying, by the processor, a location of the one or more pixels within the respective flash spot region of the first image;
   imposing, by the processor, a high cost for a data term of a graphcut-based blending function of the one or more pixels in the respective flash spot region of the first image; and
   imposing, by the processor, a zero cost for the data term of the graphcut-based blending function of the one or more pixels in the location of the one or more pixels in the second image within the respective flash spot region of the first image.

19. The method of claim 11, wherein the object is a document.

20. A method for mosaicking a plurality of images captured in a low-light condition, comprising:
   capturing, by a processor, a first image of the plurality of images in the low-light condition, wherein the first image contains a respective flash spot region;
   determining, by the processor, a spacing between each subsequent one of the plurality of images to minimize a number of the plurality of images while recovering information that is lost due to a respective flash spot region in each one of the plurality of images captured in the low-light condition using a flash spot region detection algorithm and an estimation of a movement of an mobile endpoint device capturing the plurality of images;
   capturing, by the processor, the each subsequent one of the plurality of images in accordance with the spacing;
   aligning, by the processor, the plurality of images that are captured in accordance with the spacing; and
   mosaicking, by the processor, the plurality of images that are aligned into a single image by, for each one of the plurality of images, using a Graphcut-based blending algorithm that is modified to account for pixels in the respective flash spot region that replaces one or more pixels in the respective flash spot region using one or more pixels in a subsequent image that is in a same location as the respective flash spot region such that the information is recovered in accordance with an energy minimization function comprising a data term and a smoothness term for two neighboring pixels of two overlapping images of the plurality of images, wherein pixels in a location of the respective flash spot region of a first overlapping image of the two overlapping images is imposed with a high data term cost and wherein pixels in a second overlapping image of the two overlapping images that does not have the respective flash spot region in the location is imposed with a zero data term cost.

\* \* \* \* \*